2,992,587
FIBER OPTICAL DEVICES
John W. Hicks, Jr., Fiskdale, and Wilfred P. Bazinet, Jr., Webster, Mass., assignors to American Optical Company, Southbridge, Mass., a voluntary association of Massachusetts
Filed Apr. 11, 1958, Ser. No. 727,904
5 Claims. (Cl. 88—1)

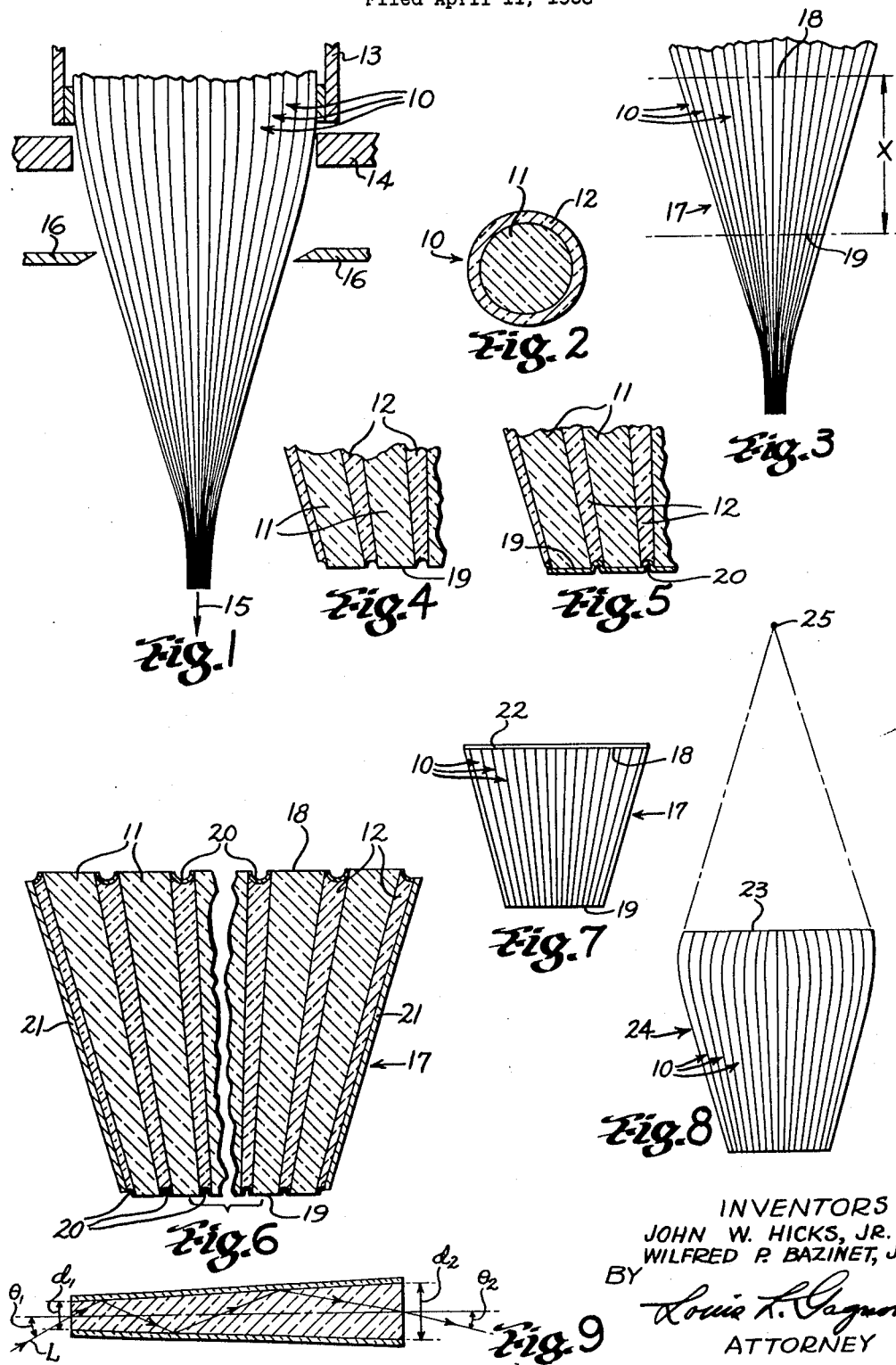
July 18, 1961 — J. W. HICKS, JR., ET AL — 2,992,587
FIBER OPTICAL DEVICES
Filed April 11, 1958
INVENTORS
JOHN W. HICKS, JR.
WILFRED P. BAZINET, JR.
ATTORNEY United States Patent Office 2,992,587
Patented July 18, 1961

This invention relates to fiber optical image transfer devices and has particular reference to optical magnifying or demagnifying devices formed of a multiplicity of light-conducting fibers or filaments in bundled relation with each other for use in transferring optical images from one location to another.

Fiber optical devices of the above general character embodying various arrangements of light-conducting fibers or elements which are tapered throughout their lengths have been used heretofore as optical image magnifiers with limited degrees of success. While such devices have provided relatively economical and compact means for magnifying optical images the magnified images which have resulted from the use of conventional fiber optical magnifiers have been lacking in definition and contrast. It has been found that one of the causes of this relatively poor contrast is the dilution of the image forming light traveling through such devices by extraneous light which is picked up thereby and trapped within the fibers. Moreover, in using clad or coated light-conducting fibers to form the bundle, some of the light which enters the coating at the light entrance end of the device is transferred to the cores of the fibers and also trapped therein thus causing a further dilution of the image forming light passing through the cores of the fibers with the result that the finally transferred optical image becomes deteriorated or lacking in contrast.

The present invention provides means for overcoming the above difficulties by providing superior fiber optical image magnifiers or demagnifiers which are capable of accurately transferring optical images with substantially no deterioration or loss of contrast in the resultant image which is transferred thereby.

It is accordingly an object of the present invention to provide simple, efficient and compact means for accurately reproducing and magnifying or demagnifying optical images while transferring said images from one location to another.

Another object is to improve the efficiency of fiber optical devices of the above character by providing novel means for preventing said devices from receiving and/or transmitting extraneous light while in use.

Other objects and advantages of the invention will become apparent from the following description when taken in conjunction with the accompanying drawings in which:

FIG. 1 is a diagrammatic illustration of means and method for performing an initial step in the forming of a device having the character of the invention;

FIG. 2 is a transverse cross-sectional view of a light-conducting fiber of a type which is used to form the device of the invention;

FIG. 3 is a side elevational view of the device of the invention which diagrammatically illustrates a further step in the processing thereof;

FIGS. 4 and 5 are greatly enlarged fragmentary cross-sectional views of the device of the invention which illustrates subsequent steps in the processing of said device;

FIG. 6 is a greatly enlarged longitudinal cross-sectional view of the finally formed device of the invention;

FIG. 7 is a side elevational view of a modification of the device of the invention;

FIG. 8 is a side elevational view of a further modified form of the device of the invention; and FIG. 9 is an enlarged longitudinal cross-sectional view of a tapered light-conducting fiber and further diagrammatically illustrates the manner in which light rays are conducted through the same.

Refering more particularly to the drawings wherein like characters of reference designate like parts throughout the several views thereof, there is diagrammatically illustrated in FIG. 1, a drawing technique by which a plurality of light-conducting elements or fibers 10 may be formed into a conically shaped or other wise similarly tapered tightly packed group or bundle from which a fiber optical magnifier or demagnifier of the character of the invention is formed.

The fibers 10 are shown in the drawings as being relatively large in cross-sectional area for purposes of better illustrating the novel features of the invention. However, it should be clear that the size of the fibers 10 would be selected in accordance with the image resolving power desired of the finally formed image transfer device. That is, in fiber optical image transfer devices which are formed of a multiplicity of closely packed light-conducting elements or fibers, the use of smaller fibers in greater numbers per unit area will produce the higher degrees of resolution of images directed through such devices.

The fibers 10 are each comprised of an inner core 11 of a relatively high index flint glass of the like and an outer coating or cladding 12 of low index glass having a high borax content such as a borosilicate glass or the like. The fibers 10 are initially formed by providing a rod-like member of the high index glass and placing a coating or envelope of the low index glass around said rod whereupon the assembly is drawn down to a desired fiber or filament size. It is pointed out that although the fibers 10 have been illustrated in the drawings as being circular in cross-sectional shape, they may alternatively be square, hexagonal, octagonal or of any other desired cross-sectional configurations.

In the forming of a tapered bundle of light-conducting fibers of the above character as shown in FIG. 1, a group of fibers 10 which are initially substantially uniformly dimensioned throughout their length are assembled together in side-by-side parallel connected relation with each other to form a composite tightly packed bundle of fibers. This initial assembly of the fibers 10 may be accomplished in the manner shown and described in an application filed February 14, 1958, in the name of Wilfred P. Bazinet, Jr. and bearing Serial No. 715,406 or by any other known technique.

One end of the bundle of fibers is then clamped within a stationary clamping member 13, FIG. 1, or otherwise held in fixed relation with a ring-like heating element 14 in such a manner as to cause its free end to extend substantially centrally through the heating element 14. By heating the bundle of fibers 10 with the element 14 to a suitable drawing temperature in accordance with the types of glasses used to form the fibers 10, the bundle is drawn away from the heating element 14 as indicated by arrow 15 to form the tapered section illustrated in FIG. 1 between its end parts. A selected portion of the tapered section of the bundle of fibers 10 is then cut or otherwise separated from the drawn bundle of fibers 10 by suitable shearing means or the like 16 to form an image magnifying member 17, FIG. 3. The opposite ends of the member 17 are next semi-finished by further cutting and/or grinding operations to provide flat semi-finished surfaces or faces at the opposite ends thereof which are in substantially parallel relation with each other and disposed substantially normal to the central longitudinal axis of the member 17 as indicated by the dot-dash lines 18 and 19 in FIG. 3. It is pointed out that the distance or spacing x between the faces 18 and 19 and the locations at which said faces are formed on the member 17 are controlled in accordance with the extent of taper or coning of the member 17 so as to ultimately provide the magnifying device of the invention with a desired power of magnification. In this respect, the face 19 is first formed at a predetermined location along the member 17 which is such as to provide a light entrance area thereon of a predetermined cross-sectional size in accordance with the size of object field which is to be covered by the member 17 when used as a magnifier. The face 18 is then formed at a distance $x$ from the face 19 in accordance with the power of magnification desired of the member 17. The power of magnification will of course increase proportionately as the distance $x$ is increased, since the comparative area sizes of the faces 18 and 19 will determine the power of magnification of the member 17. If the face 18 is constructed to be twice the size of the face 19, a 2× magnifier will obviously be formed. The extent of taper or coning to which the member 17 is initially formed will, as stated previously, be a controlling factor in the resultant thickness $x$ of the member 17 since by increasing the severity of taper or coning of the fibers 10 the distance $x$ may be proportionately decreased without changing the power of magnification of the magnifier.

Following the forming of the semi-finished faces 18 and 19 on the magnifying member 17, the cladding or insulating glass layer 12 which surrounds the cores 11 of the fibers 10 is recessed below the semi-finished ends of the cores 11, as shown in FIG. 4, by etching or otherwise removing a substantial amount of the insulating material 12 from around the cores 11 thereof. The etching of the material 12 is accomplished by immersing or otherwise applying hydrochloric acid or any other suitable etching material to the semi-finished faces 18 and 19 of the member 17 and allowing the etching material to erode a predetermined amount of the material 12 so as to recess said material well below the level of the cores 11 of the fibers 10. By initially providing a borosilicate glass coating 12 around the flint glass cores 11 of the fibers 10, as discussed above, hydrochloric acid may be successfully used to etch the material 12 in the manner illustrated in FIG. 4 without causing any appreciable etching or damage to adjacent ends of the flint glass cores 11.

A light reflective coating 20, FIG. 5, of silver, aluminum or any suitable highly reflective material is next applied to the faces 18 and 19 of the member 17 by any conventional technique such as the well known process of coating by evaporation or by simply painting the faces 18 and 19 with the reflective material.

Since the opposite ends of the cores 11 of the fibers 10 must be cleared and optically finished to receive and emit image forming light, the faces 18 and 19 of the member 17 are polished with a conventional flat polishing tool so as to remove the reflective material 20 from the ends of the cores 11 and to simultaneously optically finish their opposite ends.

Due to the fact that the cladding or insulating material 12 has been recessed as described, the reflective coating 20 between the core parts 11 of the fibers will remain untouched as shown in FIG. 6 and thus prevent light from entering the cladding material 12 through the faces 18 or 19 of the magnifying member 17. In this manner, images may be accurately transmitted through the member 17 and received at its light exit end with a high degree of contrast.

It is pointed out that tapered light-conducting fibers or bundles formed thereof have certain peculiarities as compared to the usual straight or parallel sided light-conducting fibers or devices formed therefrom. That is, the behavior of light being transmitted by the principle of internal reflection through tapered fibers differs considerably from that of conventional straight light-conducting fibers in that light traveling from the small end of a tapered fiber to its larger end tends to become collimated an amount proportionate to the difference in cross-sectional area of the opposed ends of such a fiber. Referring more particularly to FIG. 9, for example, if the half cone angle of a ray of entrance light L at the small end (of diameter $d_1$) of a tapered fiber is represented as $\theta_1$ and a half cone angle of said ray of light at the exit or large end of the fiber (of diameter $d_2$) is represented as $\theta_2$, it holds true that $$\sin \theta_2 = \frac{d_1}{d_2} \sin \theta_1$$

Since this equation is the same for a conventional lens system of corresponding magnification it is evident that a tapered fiber bundle is the full equivalent of such a lens system of zero working distance at each end. That is, in a tapered fiber bundle, the object and image planes are coincident with the respective faces thereof and the device 17 illustrated in FIG. 6 will, of course, function as a magnifier of zero working distance when an object to be viewed thereby is placed against its small end or face 19 and conversely as a demagnifier when an object to be viewed is placed against its larger end or face 18.

Since light traveling from the small end to the larger end of a tapered fiber or bundle thereof is collimated as just described, it also holds true that light traveling from the larger end to the smaller end is de-collimated or spread out. When, according to the principle of internal reflection in transilluminators of the above character, portions of said de-collimated light become spread out beyond the critical angle of reflection of the internal side walls of a particular fiber, said portions are cast loose to travel through the cladding of the fiber as stray light. Thus, it is evident that in the magnifying direction, tapered fibers or bundles thereof are very susceptible to picking up external or stray light and in the demagnifying direction, light is continually shed from the fibers. However, in a bundle of tapered fibers 17 such as shown and described herein all of the light which is shed in the demagnifying direction from the innermost fibers 10 will not be immediately shed completely from the assembly or bundle of fibers and may be re-caught as stray light to dilute image forming light being transmitted through the cores 11 of the fibers 10.

By applying the light reflecting material 20 to the ends of the cladding 12 as shown in FIGS. 5 and 6, stray light which would normally enter or exit through said ends is reflected back by the material 20.

In order to prevent external or stray light from entering the sides of the device 17, it is desirable in many instances to provide a coating or shield 21 of opaque or light absorbent material about the outer side surface of said device. The shield 21 may be formed of a coating of metal, opaque or light absorbent glass, or any such suitable material. The shield 21 may be formed integrally with the member 17 by initially placing the bundle of fibers shown in FIG. 1 within a close fitting envelope or tube of light absorbent glass and thereafter performing the above described drawing operation of FIG. 1, whereby the glass envelope will be simultaneously drawn with the fibers 10 and joined therewith in encircling relation about the tapered part of the bundle of fibers.

When used as a magnifier, the image receiving end or face 18 of the device 17 may be provided with a light diffusing plate or screen 22 as illustrated in FIG. 7 so as to cause the image forming light emitted from the fibers 10 to illuminate said screen and be scattered outwardly thereby in all direction to render all parts of the image received by said screen simultaneously visible to the eye of an observer.

In FIG. 8 there is shown further modified means for causing all parts of an image emitted at the light exit end or face 23 of a fiber optical magnifier 24 to be clearly visible at a predetermined eye point 25. The outermost fibers 10 at the light exit face 23 of the magnifier 24 are curved inwardly so as to converge slightly toward each other an amount sufficient to cause substantially all of the image forming light emitted therefrom to be directed toward the predetermined viewing location or eye point 25.

The magnifier 24 is constructed in a manner similar to the magnifier 17 with the exception that the convergent end or face 23 is initially formed by reversing a bundle of fibers 10 such as illustrated in FIG. 1 following the drawing operation described hereinabove and securing the tapered part thereof in the clamp 13 whereupon the bundle is reheated and drawn from its opposite end an amount sufficient to produce a slight taper or coning at its light exit end 23. The device 24 is then cut from the drawn bundle at predetermined locations above and below its widest part to form its light entrance and exit faces.

It should be understood that since fiber optical devices of the above character have zero working distances, the light entrance and exit ends or faces thereof may be formed to any desired shape other than the flat surfaces illustrated in the drawings. That is, the objective or image receiving end of the device 17 may be shaped to correspond to the shape of the plane of the image which is to be projected through the device 17 whether said image plane is flat, concavely or convexly curved or otherwise contoured. Moreover, the light exit end of the device 17 may be contoured to any desired shape in accordance with the shape desired of the surface in which the transferred image is to be received.

It is also pointed out that bundles of light-conducting fibers which are not tapered may be treated in the manner discussed hereinabove to prevent light from being transmitted through the coating or cladding of the fibers so as to improve the contrast of images transferred by such bundles.

It is further pointed out that instead of initially providing each core with a low index coating the said low index material may be assembled with the cores as spacer members between said cores. Such spacer members may be fused in surrounding relation with the cores during the drawing operation and will thereafter function as spacer means to retain said cores in spacer relation with each other.

From the foregoing it can be seen that simple, economical and highly efficient means and method have been provided for accomplishing all of the objects and advantages of the invention. However, it should be apparent that many changes in the details of construction or steps in the method may be made by those skilled in the art without departing from the spirit of the invention as expressed in the accompanying claims and the invention is not limited to the exact matters shown and described herein as only the preferred matters have been given by way of illustration.

Having described our invention, we claim:

1. A fiber optical device of the character described comprising, a multiplicity of tapered light-conducting fibers each having a core of light-conducting material of a relatively high index of refraction and a surrounding coating of transparent material of a relatively low index of refraction, said fibers being in tightly packed side-by-side connected relation with each other and having their longitudinal central axes in divergent relation with each other to form a composite tapered bundle of said fibers, the opposite ends of said transparent coatings surrounding each of said cores of the fibers being recessed below the respective adjacent ends of said cores, a layer of light reflecting means secured to and covering said recessed ends of said transparent coatings for preventing light from entering said ends of said coatings, the opposite ends of said cores of said fibers being optically finished for permitting image forming light to enter said cores at one of their ends and exit from said cores at their opposite ends and light absorbing means enveloping the sides of said bundle to prevent light from entering said fibers through the sides thereof.

2. A fiber optical device comprising a multiplicity of tapered light-conducting fibers each embodying a core part of light-conducting material having a relatively high index of refraction and a surrounding coating of transparent material having a relatively low index of refraction, said fibers being in intimate side-by-side connected relation with each other and having their central longitudinal axes in divergent relation with each other to form a composite tapered bundle of said fibers, each of the opposite ends of said core parts of the fibers being optically finished in planes disposed substantially normal to a central longitudinal axis through said bundle, said transparent coatings being recessed at their opposite ends below the respective adjacent ends of said core parts, a layer of light reflecting means connected to and covering said recessed ends of said coatings whereby light will be permitted to enter and exit from the ends of said core parts of the fibers but will be prevented from entering or exiting through said recessed ends of said transparent coatings.

3. A fiber optical device comprising a multiplicity of tapered light-conducting fibers each embodying a core part of light-conducting material having a relatively high index of refraction and a surrounding coating of transparent material having a relatively low index of refraction, said fibers being in intimate side-by-side connected relation with each other and having their central longitudinal axes in divergent relation with each other to form a composite tapered bundle of said fibers, each of the opposite ends of said core parts of the fibers being optically finished in planes disposed substantially normal to a central longitudinal axis through said bundle, said transparent coatings being recessed at the opposite ends thereof below the respective adjacent ends of said core parts, a layer of light reflecting means connected to and covering said recessed ends of said transparent coatings whereby light will be permitted to enter and exit from the ends of said core parts of the fibers but will be prevented from entering or exiting through said recessed ends of said transparent coatings and light absorbing means enveloping the sides of said bundle to prevent light from entering said fibers through the sides thereof.

4. A fiber optical device of the character described comprising a multiplicity of transparent fibers of light-conducting material of a relatively high index of refraction having spacer means therebetween of transparent material of a relatively low index of refraction, said fibers and spacer means being in tightly packed side-by-side relation with portions thereof connected with each other, the opposite ends of said transparent spacer means of low index of refraction surrounding the respective exposed ends of the fibers of high index of refraction being coated with a layer of light-reflecting material for preventing light from entering said ends and the opposite exposed ends of said fibers being optically finished for permitting image-forming light to enter said fibers at one of their ends and to exit from their opposite ends.

5. A fiber optical device of the character described comprising a multiplicity of tapered light-conducting fibers each having a core of transparent light-conducting material of a relatively high index of refraction and a surrounding relatively thin cladding of transparent material of a relatively low index of refraction, said fibers being in tightly packed side-by-side relation with portions of their respective claddings connected together and having their central longitudinal axes in divergent relation with each other, a relatively opaque coating of light-reflecting material covering at least one end of each of said transparent fiber claddings in surrounding relation with the adjacent exposed ends of the cores for preventing light from passing through said coated ends of said claddings and the opposite exposed ends of said cores of said fibers being optically finished for permitting light to enter said cores at one of their ends and to exit from their opposite ends.

References Cited in the file of this patent

UNITED STATES PATENTS

| | | |
|---|---|---|
| 2,311,704 | Simison | Feb. 23, 1943 |
| 2,328,302 | Simison | Aug. 31, 1943 |
| 2,510,106 | Henroteau | June 6, 1950 |
| 2,825,260 | O'Brien | Mar. 4, 1958 |
| 2,877,368 | Sheldon | Mar. 10, 1959 |